Sept. 24, 1935.　　　　A. NOVICK　　　　2,015,437
MACHINE FOR APPLYING METALLIC FASTENERS TO ENVELOPES
Filed Jan. 11, 1933　　　13 Sheets-Sheet 1

INVENTOR
Abraham Novick.
BY
ATTORNEY

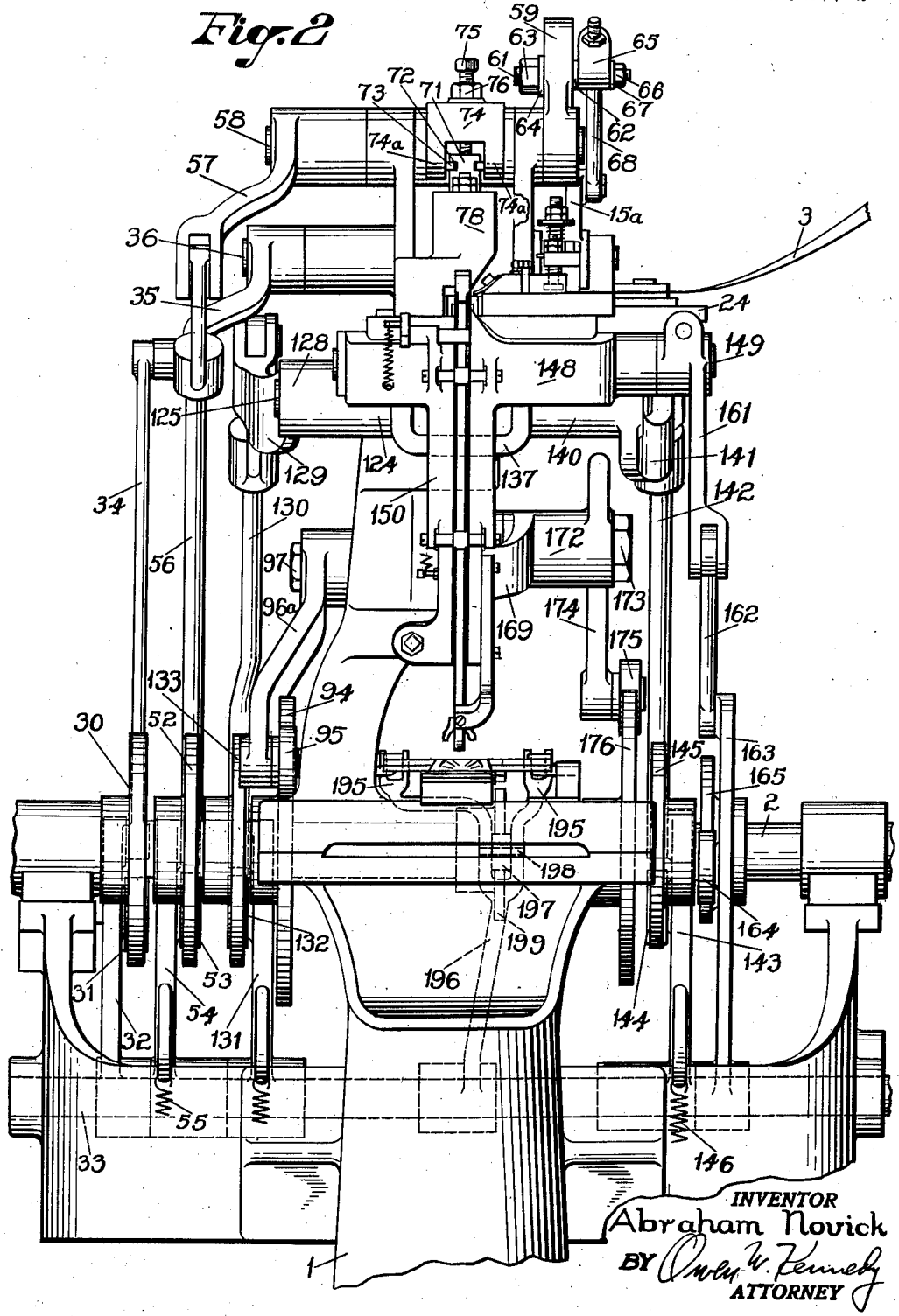

Sept. 24, 1935. A. NOVICK 2,015,437
MACHINE FOR APPLYING METALLIC FASTENERS TO ENVELOPES
Filed Jan. 11, 1933 13 Sheets-Sheet 3

INVENTOR
Abraham Novick
BY
ATTORNEY

Sept. 24, 1935.　　　　　A. NOVICK　　　　　2,015,437
MACHINE FOR APPLYING METALLIC FASTENERS TO ENVELOPES
Filed Jan. 11, 1933　　　　13 Sheets-Sheet 4
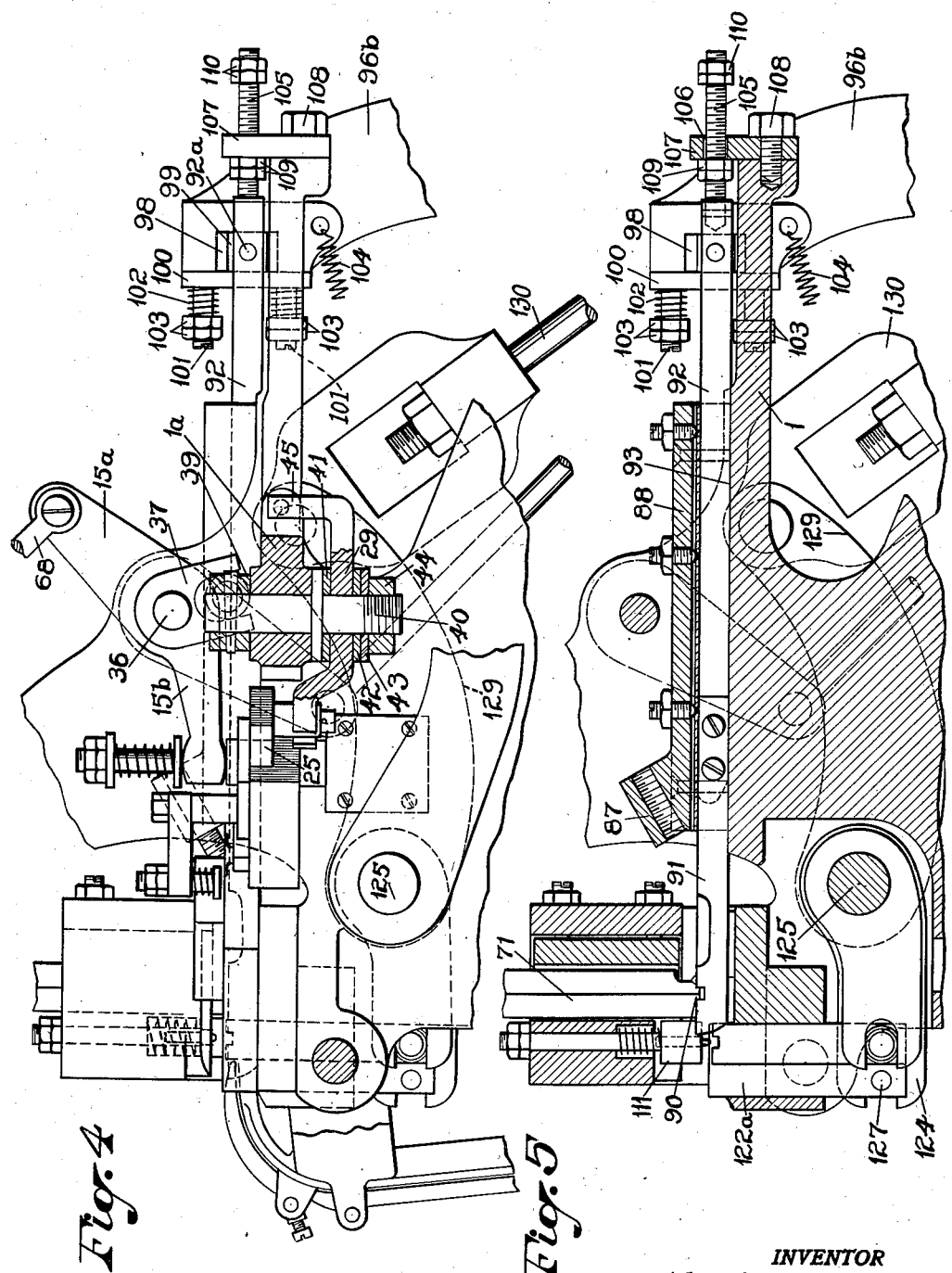
INVENTOR
Abraham Novick
BY
Owen W. Kennedy
ATTORNEY Sept. 24, 1935. A. NOVICK 2,015,437
MACHINE FOR APPLYING METALLIC FASTENERS TO ENVELOPES
Filed Jan. 11, 1933 13 Sheets-Sheet 5

INVENTOR
Abraham Novick
BY
Owen W. Kennedy
ATTORNEY

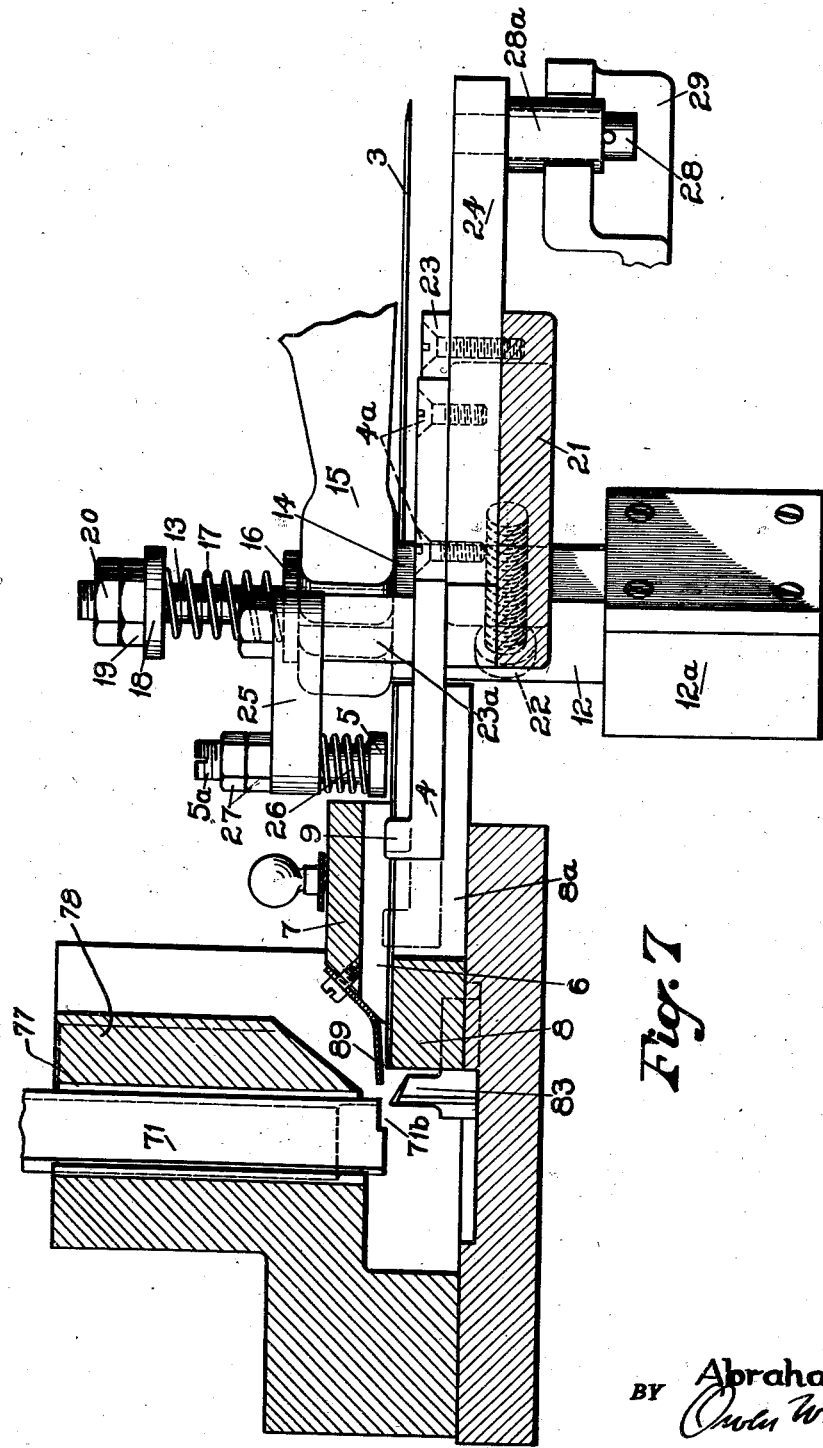

Sept. 24, 1935.  A. NOVICK  2,015,437
MACHINE FOR APPLYING METALLIC FASTENERS TO ENVELOPES
Filed Jan. 11, 1933  13 Sheets-Sheet 7
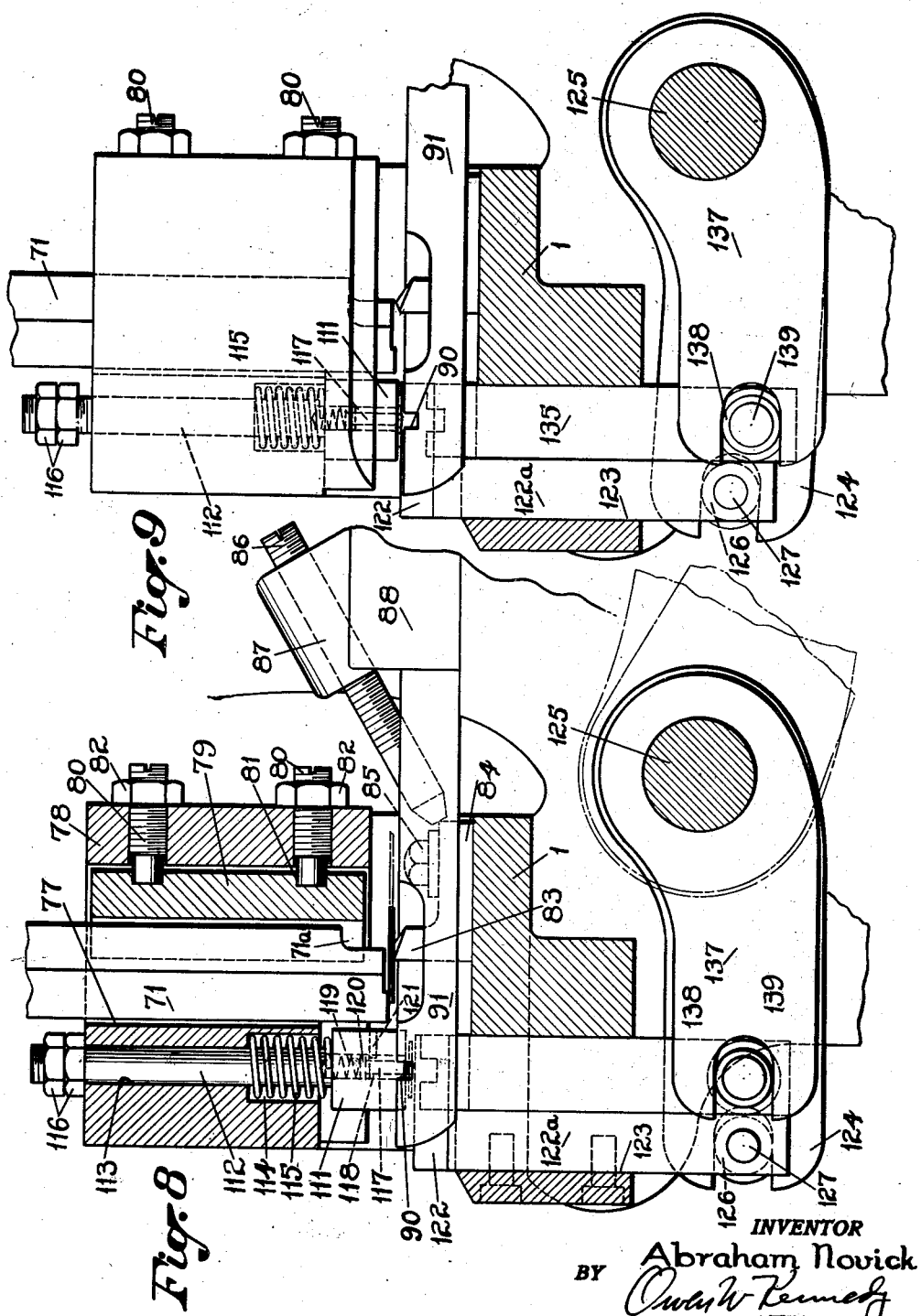
INVENTOR
Abraham Novick
BY
ATTORNEY Sept. 24, 1935.  A. NOVICK  2,015,437
MACHINE FOR APPLYING METALLIC FASTENERS TO ENVELOPES
Filed Jan. 11, 1933  13 Sheets-Sheet 8

INVENTOR
Abraham Novick
BY
ATTORNEY

Sept. 24, 1935.  A. NOVICK  2,015,437
MACHINE FOR APPLYING METALLIC FASTENERS TO ENVELOPES
Filed Jan. 11, 1933  13 Sheets-Sheet 9

INVENTOR
Abraham Novick
BY
ATTORNEY

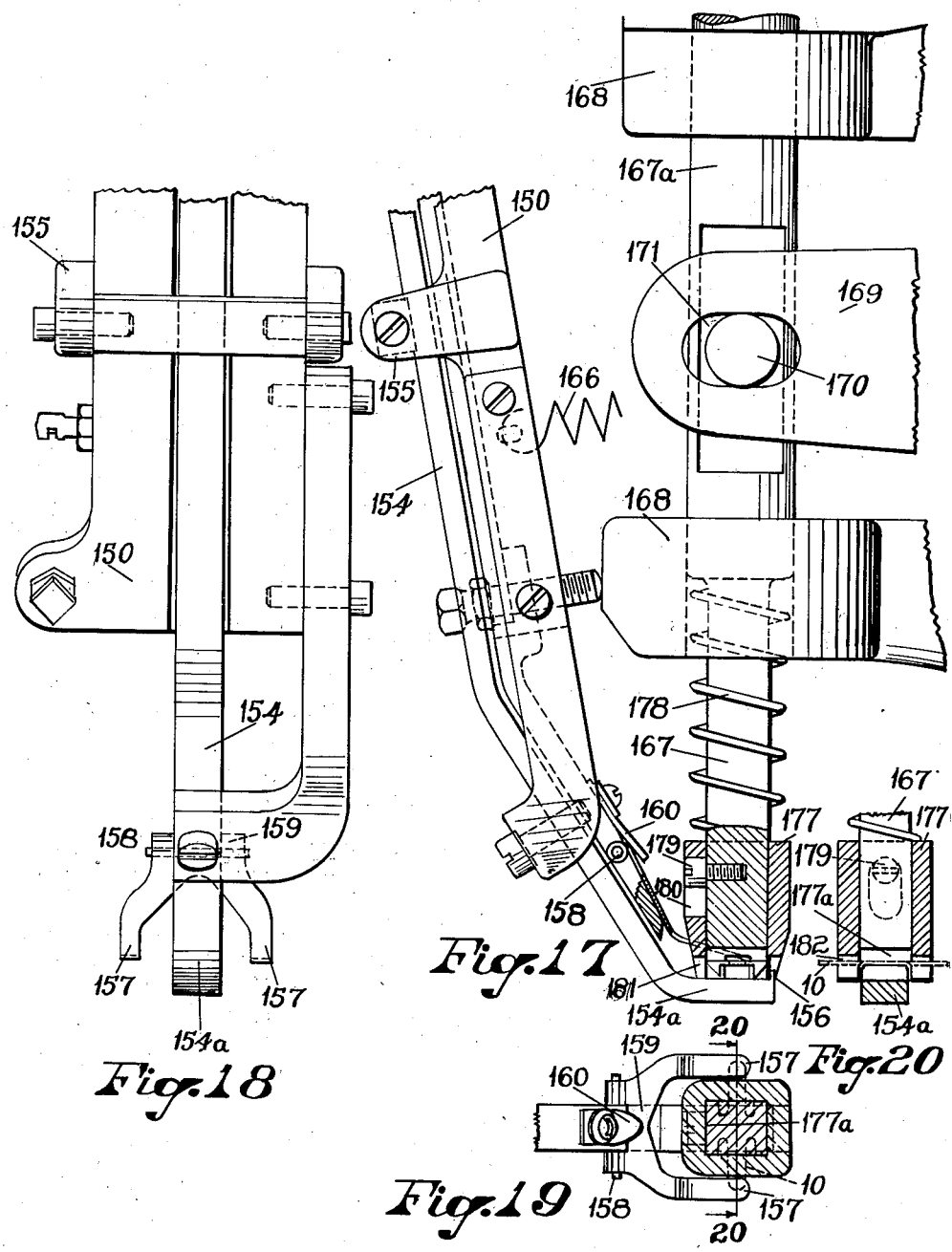

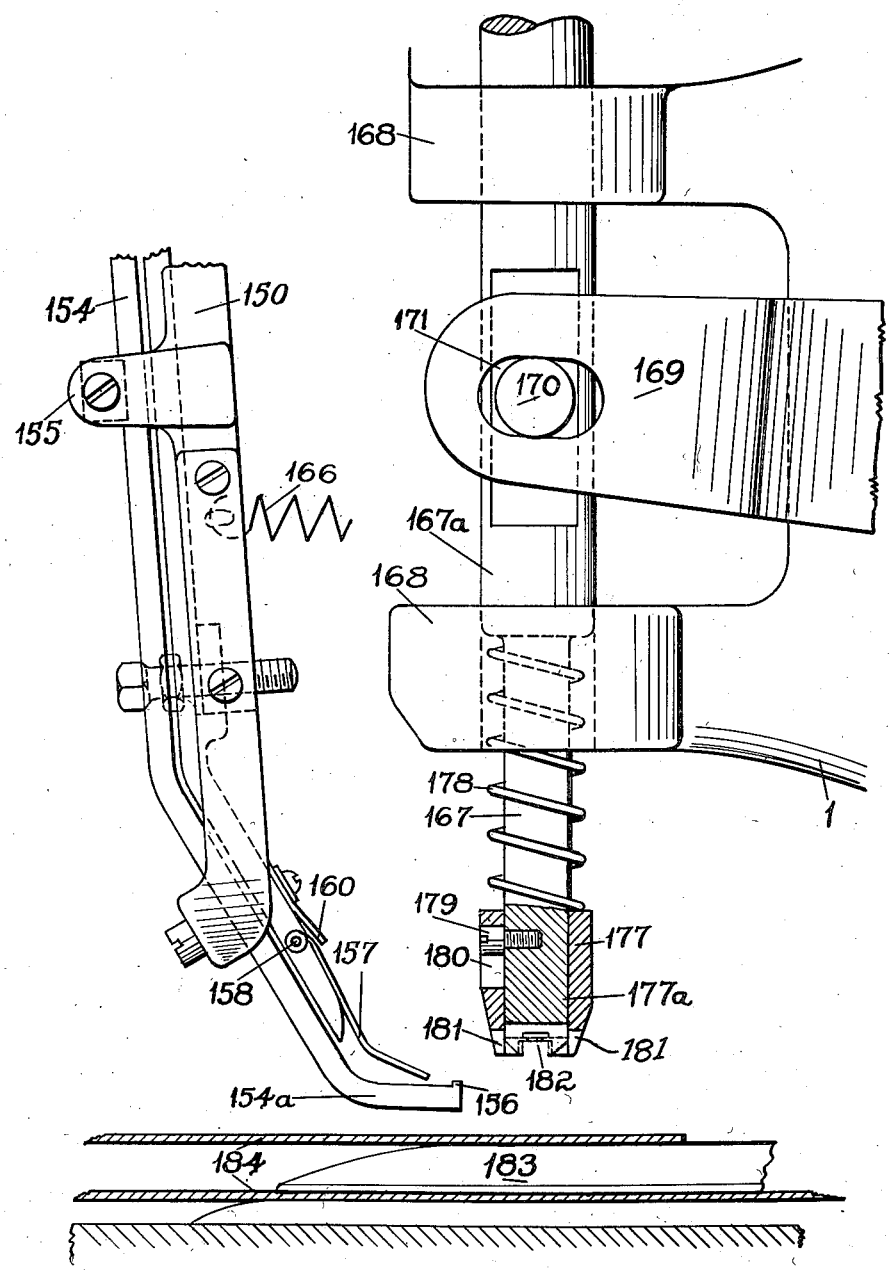

Sept. 24, 1935.  A. NOVICK  2,015,437
MACHINE FOR APPLYING METALLIC FASTENERS TO ENVELOPES
Filed Jan. 11, 1933  13 Sheets-Sheet 12
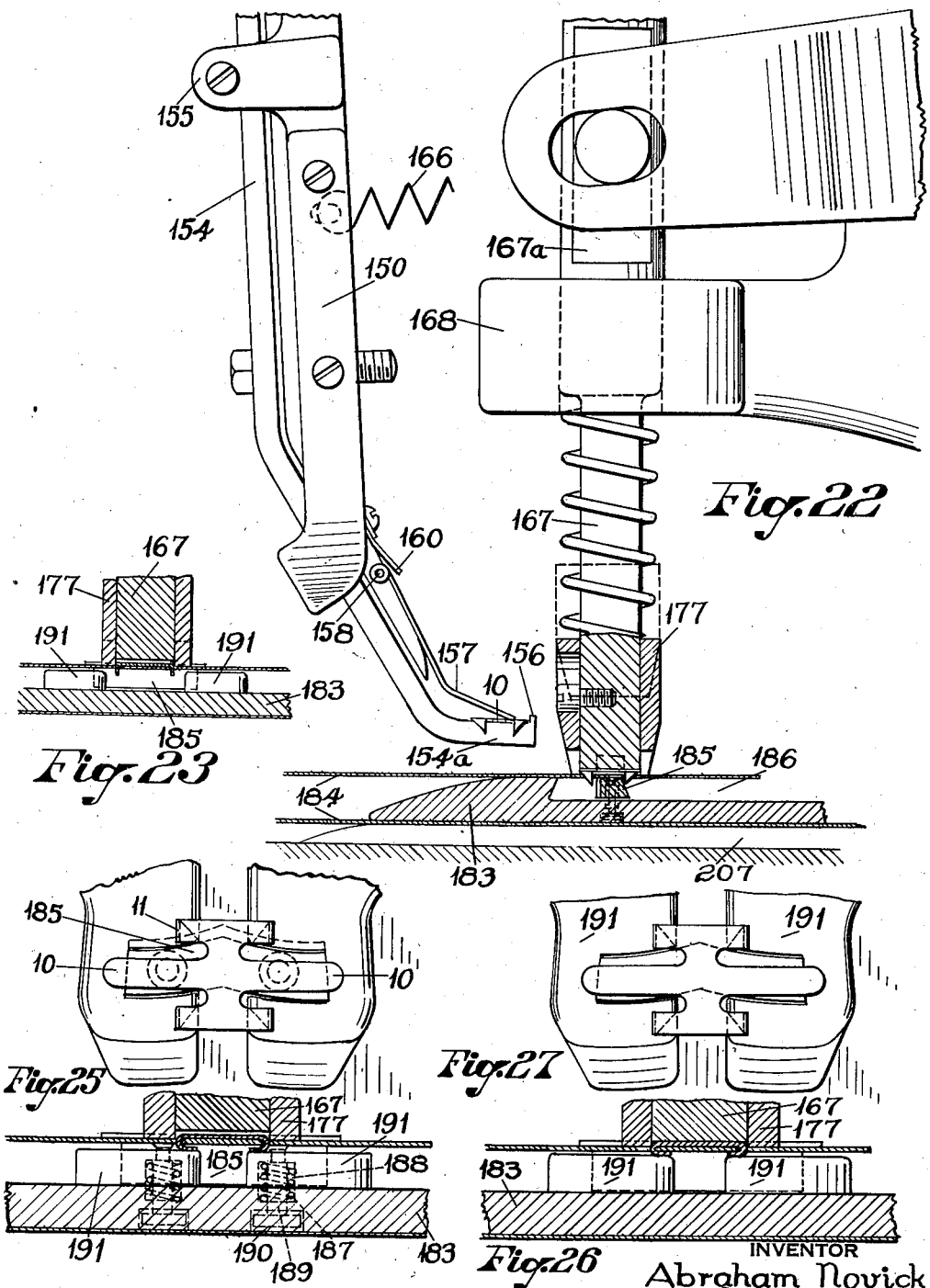
INVENTOR
Abraham Novick
BY
ATTORNEY

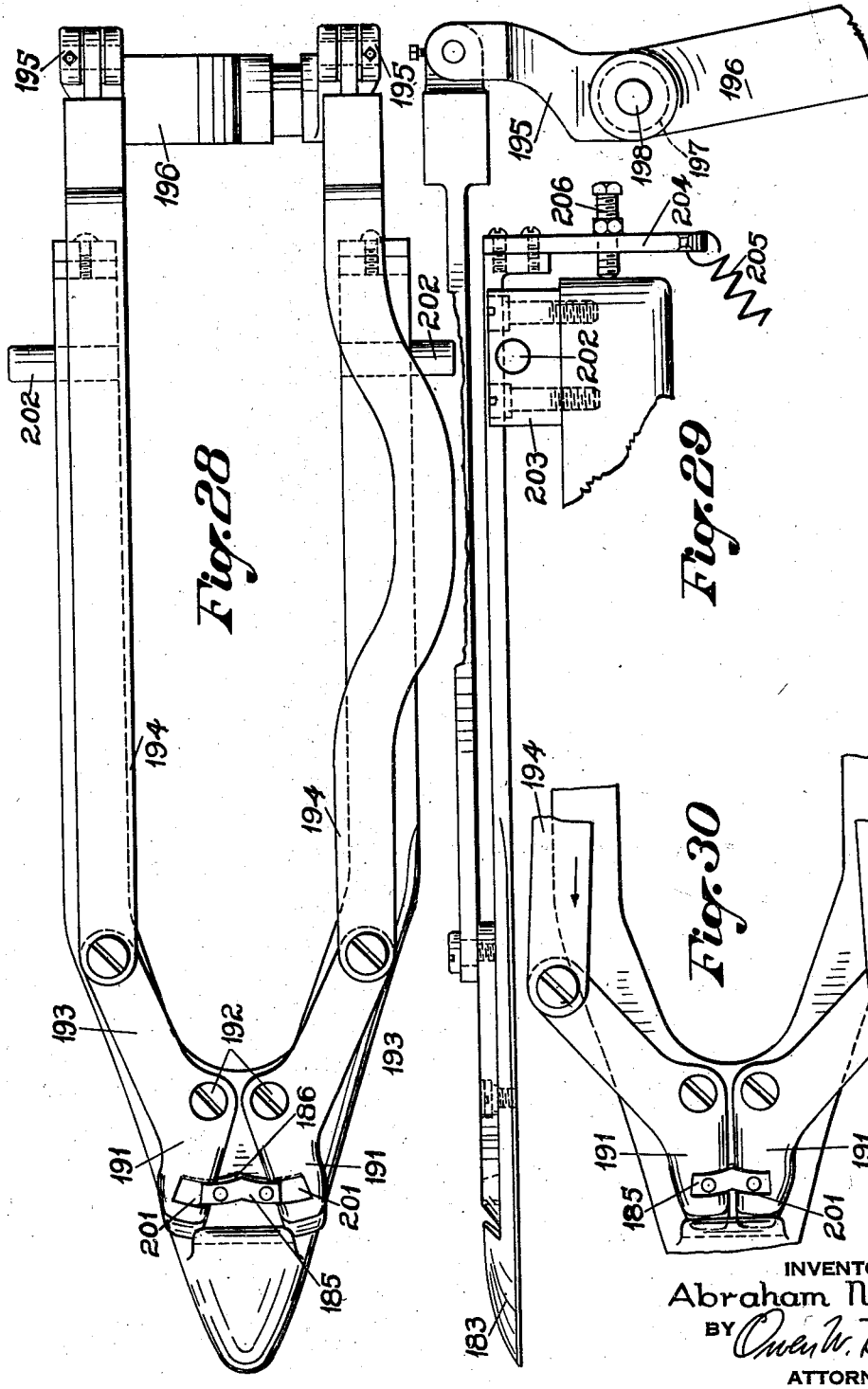

Patented Sept. 24, 1935

2,015,437

UNITED STATES PATENT OFFICE 2,015,437

MACHINE FOR APPLYING METALLIC FASTENERS TO ENVELOPES

Abraham Novick, Flushing, N. Y., assignor to United States Envelope Company, Springfield, Mass., a corporation of Maine Application January 11, 1933, Serial No. 651,193

12 Claims. (Cl. 1—2)

The present invention relates generally to machines for applying metallic fasteners to envelopes, and has for its object to provide an improved mechanism for feeding punched metallic fasteners, as a strip, severing individual fasteners therefrom, and delivering the fasteners with attaching prongs formed thereon to instrumentalities which serve to attach each fastener to an envelope.

The machine shown and described herein as an illustrative embodiment of the invention is particularly designed for handling fasteners of the type disclosed in my pending application Serial No. 515,792 filed February 14, 1931 for Fastener strips, although certain features of the invention are of utility for other purposes than the forming and setting of the particular type of fastener illustrated in the aforesaid application. The particular type of fasteners referred to above comprise pronged body portions with bendable tongues extending therefrom, the prongs being connected end to end to form a continuous strip which may be reeled, and the machine of the present invention has to do with feeding of the fastener strip, the severance of individual fasteners, the transference of control of the fasteners from the feeding to prong bending means, the delivery of the fasteners to the inserting means and the flattening of the fasteners after they have been clinched to the envelopes.

Other objects and advantages of the invention will hereinafter more fully appear from the following description with reference to the accompanying drawings, in which:—

Fig. 2 is a fragmentary, front elevation of the machine of Fig. 1.

Fig. 3 is a fragmentary, plan view of the machine of Fig. 1.

Fig. 4 is a fragmentary view in side elevation, partly broken away, illustrating particularly features of the strip feeding mechanism.

Fig. 7 is a sectional elevation taken on the line 7—7 of Fig. 6, looking in the direction of the arrows.

Fig. 8 is a detail view in sectional elevation illustrating features of the blank severing and forming mechanism.

Fig. 9 is a view similar to Fig. 8, but showing the parts at a different stage in the operating cycle.

Fig. 17 is a fragmentary view of a portion of the parts of Fig. 1, on an enlarged scale, showing the feeding of a fastener to the inserting mechanism.

Fig. 18 is a view in front elevation of the parts shown in Fig. 17.

Fig. 19 is a fragmentary plan view partially in section of a portion of the parts shown in Fig. 17.

Fig. 20 is a fragmentary sectional view along the line 20—20 of Fig. 19.

Fig. 21 is a view similar to Fig. 17, showing the parts in a different position, preparatory to inserting a fastener.

Fig. 22 is a view similar to Figs. 17 and 21 illustrating the insertion of a fastener in an envelope.

Fig. 23 is a fragmentary sectional view through the inserted fastener at right angles to Fig. 22.

Fig. 24 is a fragmentary sectional view illustrating the operation of the fastener prong clinchers.

Fig. 25 is a plan view of the clinchers shown in Fig. 24.

Figs. 26 and 27 are views similar to Figs. 24 and 25, and illustrating the application of pressure to the clinched fastener prongs.

Fig. 28 is a separate plan view of the clincher-operating mechanism.

Fig. 29 is a view in side elevation of the parts shown in Fig. 28.

Fig. 30 is a fragmentary view showing a portion of the parts of Fig. 28 in different positions.

Like reference characters refer to like parts in the different figures.

Figure 1:
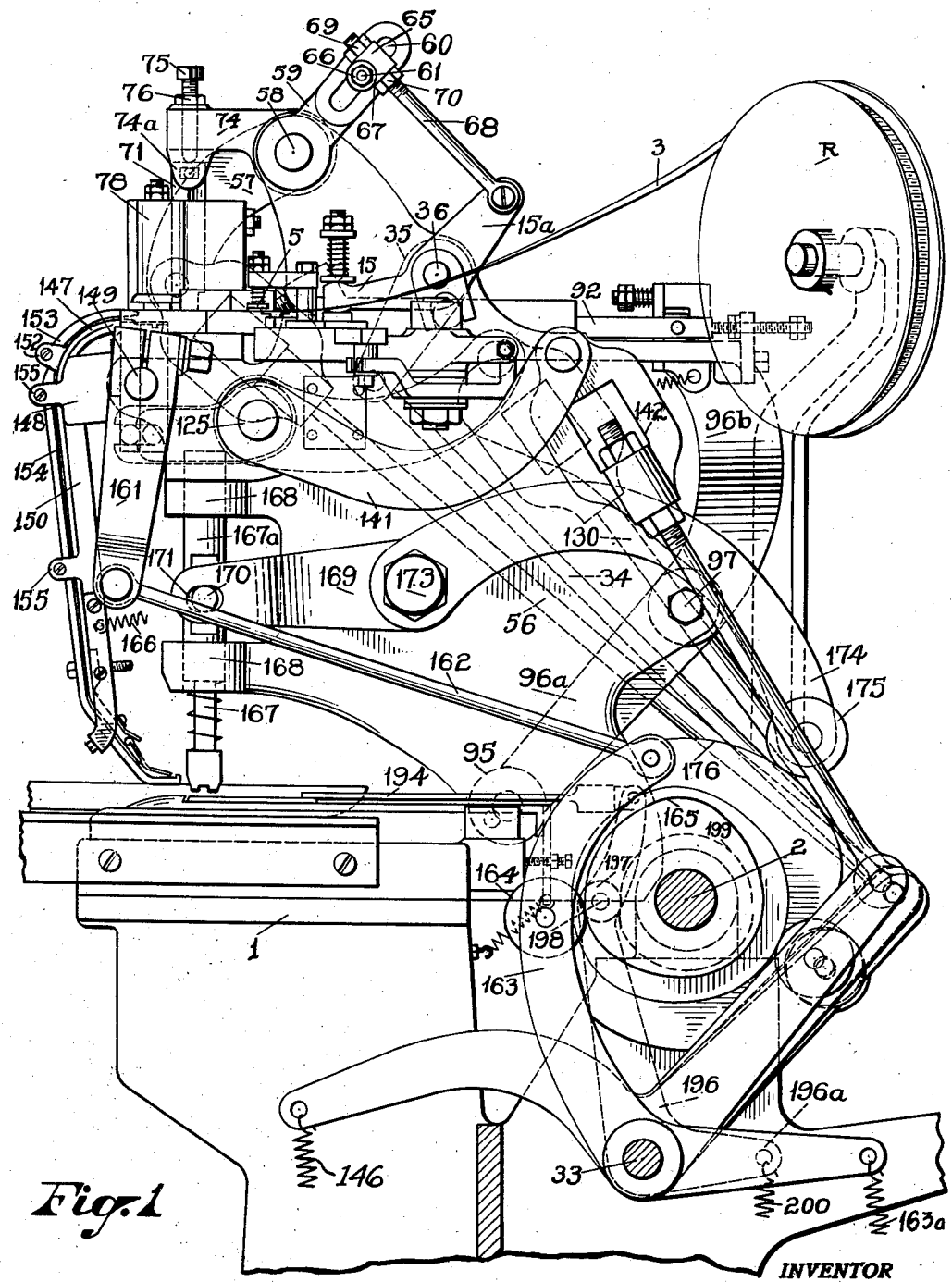
Fig. 1 is a view in side elevation of a machine embodying the present invention.

Referring first to Figs. 1 and 2, the machine comprises a frame 1 having a shaft 2 journaled therein and driven from any suitable source of power, not shown, one complete cycle of operations of the machine being performed for each revolution of the shaft 2. A strip 3 of punched fasteners is supplied to the machine from a reel R rotatably mounted on the frame 1, and as shown in Fig. 3, the strip 3 is formed as described in my aforesaid pending application Serial No. 515,792. The particular type of fastener shown herein comprises pronged body portions with bendable tongues extending therefrom, the prongs being connected end to end in the continuous strip 3, so that individual fastener blanks may be separated from the strip 3 by severance of their connected prong portions, following each operation of the strip feeding mechanism, next to be described.

*Strip feeding mechanism*

As best shown in Fig. 7, the strip 3 is led from the reel R over a reciprocatory feed bar 4 and beneath a presser foot 5 into a passage 6 formed between a cover plate 7 and a feed block 8. The feed bar 4 is movable in a slot 8a provided in block 8 and carries at its forward end an upwardly extending tooth 9 adapted to fit between the trailing tongue 10 and the trailing prong portion 11 of successive fasteners in the strip 3, as shown in dotted lines in Fig. 6. Reciprocation of the bar 4 advances the strip 3 step by step, the amplitude of the horizontal movement of the feed bar 4 being equal to the distance between the centers of adjacent fastener blanks in the strip 3.

The feed bar 4 has a four-way motion imparted thereto; that is to say, it is first advanced a step, then lowered, then retracted the same distance that it was previously advanced and then raised to engage between the trailing tongue and prong of the next succeeding fastener. While the feed bar 4 is being retracted, the presser foot 5 is maintained against the upper side of the strip 3 and frictionally holds it to the upper surface of the feed block 8 to prevent retraction of the strip. Provision is made for vertical movement of the feed bar 4 and the presser foot 5 in timed relation to one another by mounting these elements upon a vertically reciprocable post 12. The post 12 is rectangular in cross section and fits in a rectangular guideway 12a carried by the frame 1, the post 12 being free to slide, but not to turn therein. The upper portion of post 12 provides a threaded stem 13, with a shoulder 14 formed at the junction of the stem 13 with the rectangular body portion of the post. In order to impart vertical movement to the post 12, the forked end of a bell crank lever 15 is interposed between the shoulder 14 and a plate 16 on the stem 13, the plate 16 being held down against the end of forked lever 15 by a coil spring 17 encircling the stem 13. By means of a washer 18 and nuts 19 and 20 on the stem 13, the pressure of the spring 17 is maintained strong enough to cause the post 12 to normally move vertically in unison with the engaged portion of the bell crank lever 15, the spring 17 yielding to prevent breakage or jamming when an obstruction is encountered.

Figure 6:
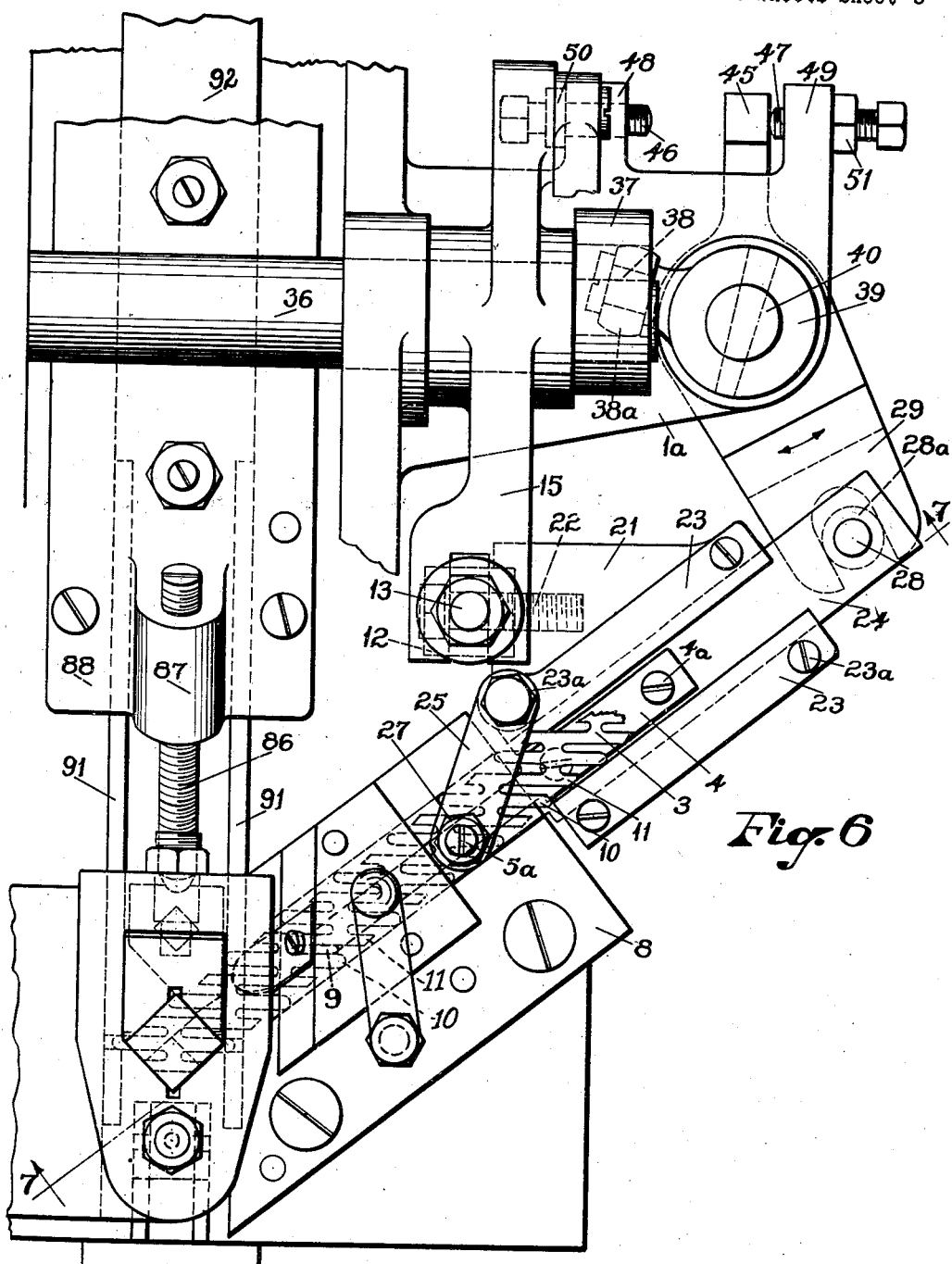
Fig. 6 is a plan view, on an enlarged scale, of the mechanism illustrated in Figs. 4 and 5.

As best shown in Fig. 6, the post 12 outlined in dotted lines carries a laterally extending channelled guide block 21 fixed to it by means of a stud 22, and plates 23 secured to the block 21 in which fits a horizontally movable slide 24. One of the plates 23 provides a boss 23a on which is mounted an arm 25 extending over the slide 24, see Fig. 7, and carrying the presser foot 5. A spring 26 surrounding the stem 5a of the foot 5 serves to yieldingly maintain the foot 5 spaced above the feed bar 4 a distance determined by the stop nuts 27 on the stem 5a.

The feed bar 4 is mounted upon the forward end of the slide 24, as by means of screws 4a, so that the post 12, through the bell crank lever 15, controls the vertical position of both the slide 24 and the feed bar 4. The slide 24 is provided at its rear end with a downwardly extending pin 28 having journaled thereon a sleeve 28a, the sleeve 28a being received between the arms of a forked crank 29, see Fig. 6, adapted by its oscillatory motion to move the bar 24 back and forth horizontally. The sleeve 28a, however, not being secured to the crank 29, is freely movable vertically with relation thereto, so that the crank 29, while adapted to impart horizontal movement to the feed bar, does not in any way affect the vertical position, or the vertical movements, of the bar with the post 12.

As best shown in Figs. 2 and 3, horizontal movements of the slide 24 carrying the feed bar 4 are under the control of a cam 30 mounted on the drive shaft 2. The cam 30 acts through a roll 31 carried by a lever 32 pivotally mounted on a countershaft 33 below the drive shaft 2, turning of the lever 32 by the cam 30 serving to impart reciprocatory movement to an upwardly extending connecting rod 34. The connecting rod 34 is pivotally connected at its upper end to a crank arm 35 carried at one end of a shaft 36 extending across the upper portion of the machine parallel to the shaft 2. As best shown in Figs. 4 and 6, the opposite end of the cross shaft 36 carries a forked crank 37, the arms of which embrace a roll 38a mounted on a pin 38 projecting horizontally from a collar 39. The collar 39 is pinned to the upper end of a vertical shaft 40 journaled in a portion 1a of the frame 1, shown in section in Fig. 4. That portion of the shaft 40 extending below the frame portion 1a carries a collar 41, also pinned to the shaft 40 and the forked crank 29 for operating the slide 25 is mounted on the shaft 40 below the collar 41. The crank 29 is yieldingly connected to the shaft 40 by means of friction disks 42 and 43 adapted to clamp a portion of the crank 29 against the lower collar 41 through the pressure of a nut 44.

In order to accurately control the movement of the feed bar slide 24 in response to oscillatory movement of the crank 29, an extension 45 of the crank, best shown in Fig. 6, is disposed between opposed stops 46 and 47, the stops being threaded into spaced lugs 48 and 49 respectively, provided by the frame 1a. In order to set the stops 46 and 47 in any desired position to limit movement of the crank extension 45, lock nuts 50 and 51 are provided, and obviously the yieldable connection of the crank 29 to the shaft 40 permits the stroke of the feed bar slide 25 to be very accurately set. That is to say, the amplitude of the oscillatory movement of the shaft 40 under the control of the cam 30 may be such as to tend to move the slide 25 beyond the desired limits of its stroke, as determined by the stops 46 and 47, the frictional disks 42 and 43 yielding to permit over-running of the shaft 40 with respect to the crank 29. With the above described mechanism, it is evident that for each complete revolution of the drive shaft 2, the slide 25 carrying the feed bar 4 will have imparted thereto a complete back and forth movement in a horizontal plane, which is combined with a vertical movement of the post 12 in the manner next to be described.

Referring again to Figs. 2 and 3, vertical movement is imparted to the post 12 from a cam 52 mounted on the drive shaft 2, the cam acting through a roll 53 carried by a lever 54 pivotally mounted on the countershaft 33. The roll 53 is maintained in engagement with the surface of the cam 52 by means of a spring 55, and turning of the lever 54 imparts movement to an upwardly extending connecting rod 56. The upper end of rod 56 is connected to a crank arm 57 mounted on a shaft 58 extending across the upper portion of the machine just above the cross shaft 36. The opposite end of the cross-shaft 58 carries a second crank arm 59 extending upwardly, and as best shown in Figs. 1 and 2, the arm 59 provides a slot 60 for slidably receiving a pin 61. The pin 61 provides a collar 62 for engaging the right hand face of the slot 60, as viewed in Fig. 2, and the pin is held in the slot 60 by means of a nut 63 in threaded engagement with the left hand end of the pin 61 and cooperating with a washer 64. Thus that portion of the pin 61 between the collar 62 and washer 64 is held in the slot 60 against sidewise movement, although free to move longitudinally of the slot.

A portion of the pin 61 projecting beyond the collar 62 passes freely through a block 65, and is clamped therein by means of a nut 66 cooperating with a washer 67. As best shown in Fig. 1, the block 65 receives the threaded end of a connecting rod 68 adjustably maintained on the block 60 between nuts 69 and 70, with the lower end of the rod 68 pivotally connected to an upwardly extending arm 15a of the bell crank lever 15, which is freely turnable on shaft 36. As previously pointed out, the other end of lever 15 being received between the shoulder 14 and plate 16 of the post 12, is adapted to impart vertical movement to the feed bar slide 24 in response to turning of the lever 15 by the connecting rod 68. Thus the vertical movement of the feed bar slide 24 is directly under the control of the cam 52 acting through the cross shaft 58, with the amplitude of this movement adapted to be controlled through the adjustment of the rod 68 in the block 65.

The cams 30 and 52 controlling the movements of the feed bar slide 24 and of the post 12 respectively, are so timed that a four-way motion is imparted to the feed bar 4. Starting from the full line position of Fig. 7, the feed bar 4 first moves to the left to the dotted line position to feed the strip 3 an amount determined by the distance between centers of adjacent blanks, then downwardly to clear the tooth 9 from the strip 3, then to the right in position for the next feeding movement, and then upwardly back to the full line position of Fig. 7. The compound movement of the feed bar 4, as above described, is accompanied by a simple up and down movement of the presser foot 5, which being mounted directly on the guide block 21, as shown in Fig. 6, partakes only of the vertical movement of the post 12. As a result, the presser foot is maintained in position above the strip 3, as shown in Fig. 7, while the feed bar 4 is advancing the strip 3 for a feed, after which the presser foot 5 engages the strip at the end of the downward movement of the feed bar 4 to clear its finger 9 from the strip. During the return movement of the feed bar 4, free of the strip, the presser foot 5 is yieldingly maintained in engagement with the strip 3 to hold the same in position as it is fed, the presser foot 5 releasing the strip only when the bar 4 is moved upwardly at the end of the cycle to reengage the tooth 9 with the strip.

Blank cutting mechanism

At the same time that the presser foot 5 is moved downwardly to engage the strip 3 after a feeding movement, a cutter 71 is moved downwardly to sever the leading fastener blank from the strip 3. The cutter 71 is rectangular in cross section, and as best shown in Figs. 1 and 2, the upper portion thereof provides grooves 72 in opposite faces for the reception of pins 73 projecting inwardly from the spaced arms 74a of an actuating lever 74 mounted to turn with the same shaft 58 carrying the crank arm 59 which operates the bell crank lever 15 for moving the post 12 vertically. A stud 75 extends through the end of lever 74 between the arms 74a to engage the top of the cutter 71, the stud 75 being locked into position by a nut 76. The engagement of the top of the cutter 71 by the lower end of the stud 75 serves to relieve the pins 73 of strain when the cutter 71 is severing the strip 3, the pins 73 bearing the weight of the cutter only when lifting the same to the non-operating position.

Figure 12:
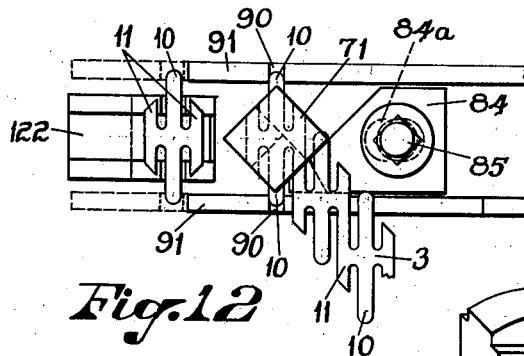
Fig. 12 is a fragmentary plan view illustrating details of the arrangement of the severing and forming means and of the means for transferring the blanks from the severing means to the forming means.

As best shown in Fig. 8, the cutter 71 is guided in a slot 77 extending vertically through a block 78 forming part of the frame, the slot 77 being partially occupied by a gib 79 suitably grooved to fit the rear portion of the cutter 71. Screws 80 threaded through the rear wall of the slot 77 have their inner reduced ends received in seats 81 provided in the gib 79, the screws 80 serving to maintain the gib in position to cause the cutter 71 to fit snugly in the slot 77, without binding. Nuts 82 serve to lock the screws in position following an adjustment of the gib 79. A stationary cutter 83 is adapted to cooperate with the movable cutter 71, the cutter 83 projecting upwardly from a plate 84 mounted on a portion of the frame, with its cutting edge positioned so that the strip just clears the same as it is fed by the bar 4 between the cutters. As best shown in Fig. 12, the stationary cutter plate 84 provides a slot 84a, and a bolt 85 passing through the slot and threaded into the frame retains the cutter 83 in position after its adjustment with respect to the movable cutter 71. As best shown in Fig. 8, in order to obtain very close adjustment of the cutter 83, after loosening the bolt 85, a screw 86 threaded through a boss 87 on a fixed plate 88 has its end bearing on the rear edge of the cutter plate 84. The adjusting screw 86 extending at an angle to the cutter plate 84 also serves to absorb some of the blow of the movable cutter 71 when the strip is being sheared and prevent the cutter 83 from changing its position with respect to the cutter 71.

Figure 16:
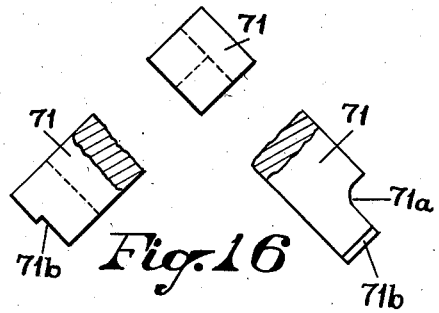
Fig. 16 is a fragmentary view illustrating the construction of the cutter punch.
Figure 14:
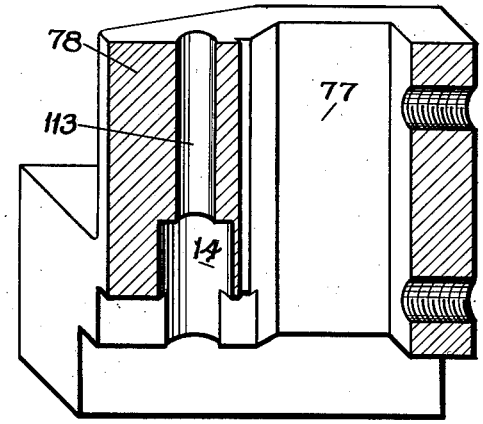
Fig. 14 is a view in sectional elevation of a block wherein certain of the severing and forming instrumentalities are mounted.

It is evident from a consideration of Figs. 8 and 12 that the shearing edge of the cutter 83 extends only below the joined prong portions 11 of the strip 3, and in order to insure clean cutting of the strip 3 without deformation of the remainder of the strip, the lower end of the cutter 71 is cut away or relieved at 71a, see Fig. 16, so that it does not engage the tongue 10 of the next adjacent blank. Furthermore, the lower end surface of the cutter 71 is relieved at 71b, see Fig. 7, so that the shearing edge of the cutter 71 is limited to a length substantially the same as the shearing edge of the stationary cutter 83. On the upward stroke of the cutter 71 following the shearing of a fastener blank from the stock 3, a stripper plate 89 extending downwardly from the cover plate 7, as shown in Fig. 7, prevents the severed end of the strip from following the cutter 71 upwardly, so that the leading end of the strip will lie in position to be fed between the separated cutters.

Figure 5:
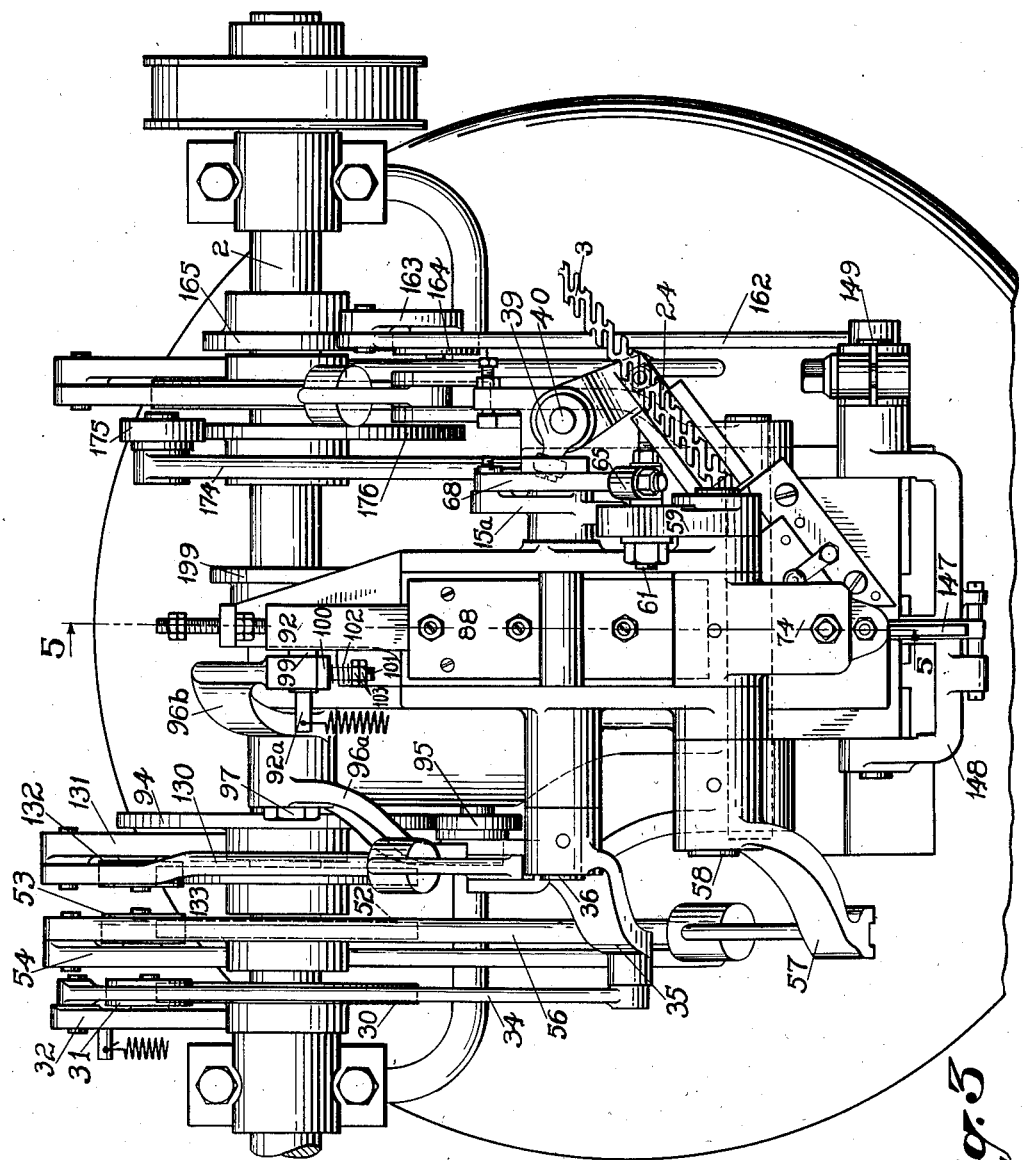
Fig. 5 is a sectional view along the line 5—5 of Fig. 3 illustrating the same portion of the machine as Fig. 4.
Figure 10:
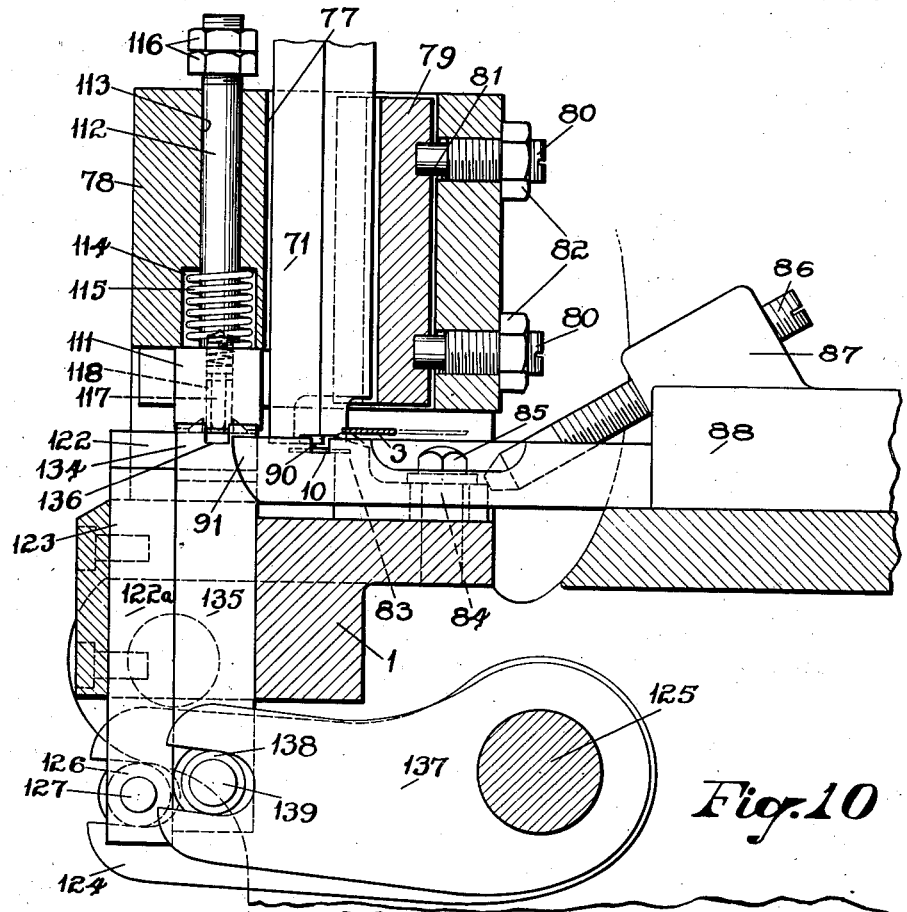
Figs. 10 and 11 are views similar to Figs. 8 and 9 but showing the parts, successively, farther advanced in the operating cycle.

As best shown in Figs. 10 and 12, when a blank is severed from the strip 3 by the downward stroke of the cutter 71, the oppositely extending tongues 10 of the blank are received in alined notches 90 provided in spaced arms 91 carried by a reciprocatory transfer bar 92. As best shown in Fig. 5, the transfer bar 92 is adapted to slide in a slot 93 provided in the frame 1, with the plate 88 forming a cover for the slot 93, and with the forwardly projecting arms 91 movable on either side of the stationary cutter plate 84 as the transfer bar 92 is reciprocated by mechanism which will next be described.

*Transfer mechanism*

As best shown in Figs. 1 and 2, the transfer bar 92 is adapted to receive a reciprocatory movement from a cam 94 on the drive shaft 2, upon which bears a roll 95 mounted at the lower end of one arm 96a of a lever pivotally mounted on a stud 97. The other arm 96b of this lever extends upwardly above the stud 97 and terminates at a point adjacent to the rear end of the transfer bar 92. As best shown in Figs. 3 and 4, the upper end of the lever arm 96b provides an opening 98 for receiving a block 99 pivotally mounted on a pin 92a projecting laterally from the transfer bar 92. The block 99 is maintained in the opening 98 by a plate 100 yieldably mounted on pins 101 extending forwardly from the lever arm 96b on opposite sides of the opening 98. The pins 101 are surrounded by springs 102 which serve to maintain the plate 100 in the position shown, with a pressure determined by adjusting nuts 103 on the threaded ends of the pins 101. A spring 104 connected at its ends to the lever arm 96b and a fixed point on the frame 1 serves to pull the lever arm 96b to the left, as viewed in Fig. 4 when permitted to do so by the cam 94. In the position of parts shown in Figs. 4 and 5, the cam 94 acting through the lever arms 96a and 96b positively maintains the transfer bar 92 in a retracted position in which the notches 90 in the transfer arms 91 are in position to receive the tongues 10 of a fastener, as severed from the stock 3 by the cutter 71.

In order to positively determine the limits of the movements of the transfer bar 92, so as to accurately position the fastener tongue receiving notches 90, with respect to the cutter 71, the rear end of the bar 92 provides a threaded rod 105 extending freely through an opening 106 provided in a plate 107 secured to the frame by a bolt 108. The rod 105 carries pairs of stop nuts 109 and 110 respectively, which obviously can be set upon the rod 105 in position to positively determine the limits of the movements of the transfer bar 92. As shown in Fig. 4, the bar 92 is in its extreme retracted position in which the stop nuts 109 are in engagement with one face of the plate 107, and obviously, any tendency for the lever arm 96b to move the bar 92 beyond this position under the influence of the cam, results in yielding of the plate 100 which maintains the block 99 in the lever opening 98. Thus the yieldability of the plate 100 prevents any shock or strain on the transfer bar 92, due to extra motion of the lever arm 96b. Since as previously pointed out, the forward movement of the bar 92 to transfer a fastener blank is caused by the pull of the spring 104 when permitted by the cam 94, there will be no shock on the bar 92 when the stop nuts 110 engage the plate 107 and determine the forward limit of travel of the transfer bar 92.

From the foregoing, it is apparent that during each complete revolution of the drive shaft 2, the cam 94 imparts a back and forth movement to the transfer bar 92, so that the alined notches 90 of the transfer arms 91 occupy the extreme positions shown in Figs. 8 and 10 respectively. In Fig. 10 the tongues 10 of a fastener blank just severed from the strip 3 are shown as being seated in the notches 90, while in Fig. 8, the transfer arms 91 are shown as having been moved forwardly to cause the notches 90 to centrally position the fastener blank beneath a former block 111.

Still referring to Fig. 8, the former block 111 provides a reduced stem 112 extending upwardly through and slidable in a bore 113 of the block 78, the bore 113 being parallel to the slot 77 in which the cutter 71 is movable. The bore 113 provides a countersunk portion 114, in which is received a spring 115 surrounding the stem 112. The spring 115 pressing on the block 111 below the stem 112 serves to yieldingly maintain the block 111 in a position determined by stop nuts 116 threaded on the upper portion of the stem 112. As shown in Fig. 8, the stop nuts 116 are so adjusted as to maintain the lower face of the block 111 just above the plane of a fastener blank supported in the notches 90 when the blank is transferred from the cutting station to the forming or bending station. With a fastener blank in the position shown, the central portion thereof is engaged by a stripper 117 received in an opening 118 extending centrally of the block 111. The stripper 117 is yieldingly held in position, with its end just protruding beyond the lower face of the block 111 by a spring 119, a shoulder 120 cooperating with a pin 121 serving to limit downward movement of the stripper 117 under the pressure of the spring 119. The function of the stripper 117 in clearing a fastener from the block 111, after the prong bending operation, will be hereinafter referred to.

When the transfer arms 91 position a fastener beneath the lower end of the former block 111, as just described, the lower surface of the fastener blank is supported just clear of the upper surface of a clamping bar 122. The clamping bar 122 is shown in perspective in Fig. 15, from which it is apparent that the top of the bar is of substantially the same width as the block 111. Consequently, when a fastener blank is transferred to the forming station as indicated at the left in Fig. 12, the pointed prong portions 11 of the blank extend beyond the longitudinal edges of the top surface of the bar 122.

Following the positioning of a blank between the opposed faces of the former block 111 and the clamping bar 122, a vertical extension 122a of the bar 122 is moved upwardly in a guideway 123 provided in the frame 1 to lift the fastener blank out of the transfer notches 90 and carry it into clamping engagement with the lower face of the block 111, as shown in Fig. 9. Upward movement is imparted to the bar 122 by means of a lever arm 124 pivotally mounted on a shaft 125 extending across the machine below the transfer mechanism. The free end of the lever arm 124 is slotted to receive a roll 126 mounted on a pin 127 projecting from the lower end of portion 122a of the clamping bar 122. As best shown in Figs. 2 and 5, the arm 124 is integral with a sleeve 128 turnable on the shaft 125, the sleeve 128 providing a second arm 129 extending rearwardly and connected at its free end to an adjustable link 130. The link 130 extends downwardly and is pivotally connected at its lower end to a lever 131 mounted on the countershaft 33 and carrying a roll 132 bearing on the surface of a cam 133 on the drive shaft 2. The cam 133 is so timed that following the transfer of a blank from the cutting station to the forming station, upward movement will be imparted to the clamping bar 122 to lift the fastener out of the transfer notches 90 of the arms 91 and carry it into engagement with the yieldable former block 111. The upward movement of the bar 122 is sufficient to carry the block 111 upwardly until it abuts the lower end of its bore 113, thereby compressing the spring 115 and solidly supporting the block against further upward movement. At the same time the stripper 117 is fully retracted within the block 111, all as clearly shown in Fig. 9. After the fastener blank has been lifted clear of the notches 90 and clamped rigidly against the block 111, the transfer bar 92 is retracted to clear the arms 91 of the fastener and again position the notches 90 beneath the cutter 71, as shown in Fig. 10, during which time the pointed prong portions 11 of the fastener blank are bent upwardly in a manner next to be described.

Prong bending mechanism

Figure 15:
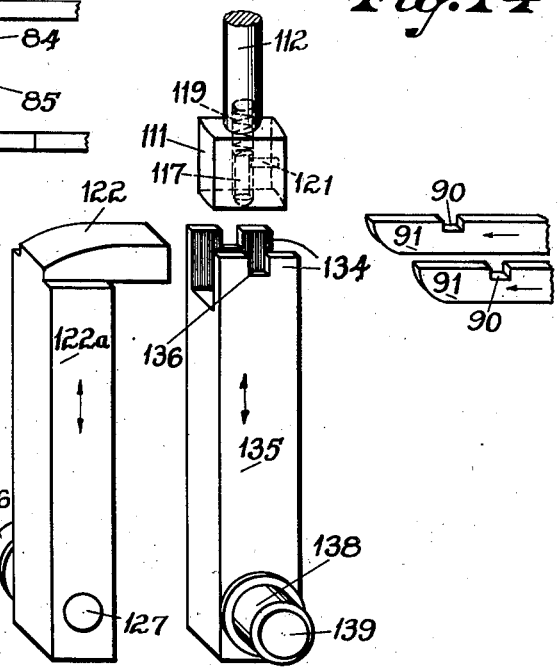
Fig. 15 is a view showing a supporting block, the inside former and the outside former, separately, but in such relation as to indicate how these parts are associated in the machine.
Figure 13:
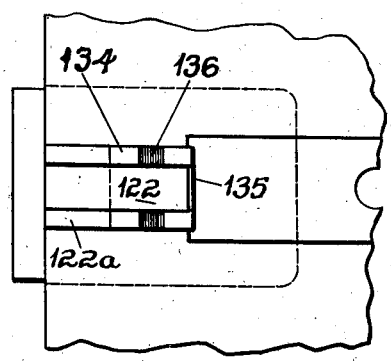
Fig. 13 is a fragmentary, detail plan view of the forming mechanisms and parts associated therewith.

As best shown in Figs. 12 and 15, the clamping bar 122 is adapted to move between the upwardly extending arms 134 of a plunger 135 extending parallel to the vertical portion 122a of the clamping bar 122. The arms 134 of the plunger 135 provide alined notches 136 of substantially the same width but deeper than the notches 90 on the transfer arms 91, and assuming that a fastener blank has been clamped between the bar 122 and the former block 111, as shown in Fig. 9, it is evident that upward movement of the plunger 135 from the position of Fig. 9 to the position of Fig. 10 will result in the arms 134 of the plunger 135 simultaneously bending the pronged portions 11 of the blank upwardly around the edges of the stationary former 111. As the prong bending occurs, the tongues 10 of the blank remain undisturbed, owing to the depth of the notches 136 in the arms 134.

The plunger 135 carrying the prong bending arms 134 is movable vertically in the guideway 123 by means of a lever arm 137 mounted on the shaft 125 with its forked end portion receiving a roll 138 carried by a pin 139 projecting from the lower end of the plunger 135. As shown in Fig. 2, the lever arm 137 is integral with a sleeve 140 turnable on the shaft 125, the sleeve 140 providing a second arm 141 extending rearwardly and connected at its free end to a link 142. The lower end of link 142 is connected to the free end of a lever 143 carrying a roll 144 maintained in engagement with a cam 145 on the drive shaft 2 by means of a spring 146.

Figure 11:
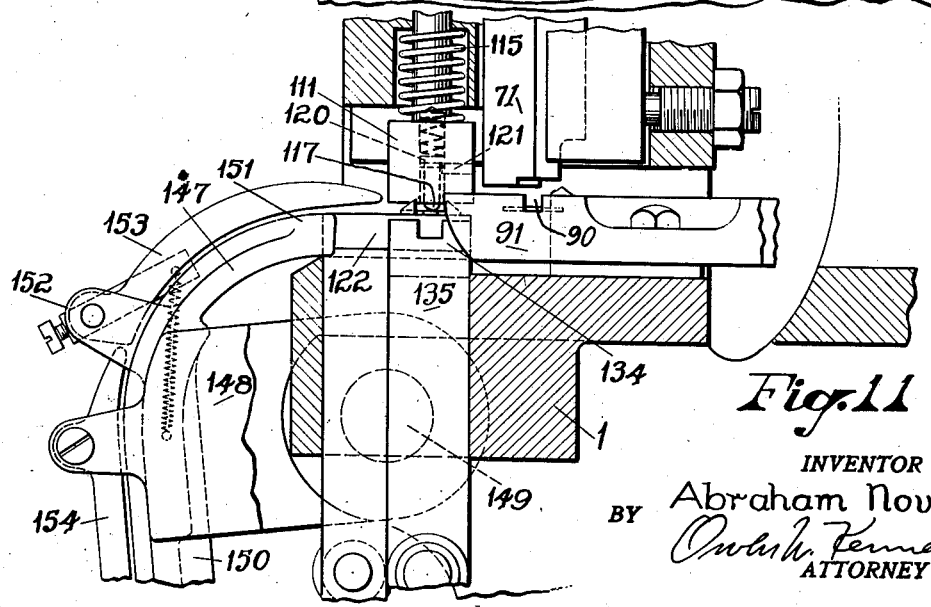

The cam 145 controlling the prong bending plunger 135 is so timed that following the prong bending operation shown in Fig. 10, the plunger 135 will be moved downwardly into the position of Fig. 11. This movement entirely clears the bending arms 134 from the blank, so that when the clamping bar 122 is lowered, as also shown in Fig. 11, to free the pronged blank from the former block 111, the fastener will be supported freely on the bar 122. Downward movement of the bar 122 is accompanied by stripping of the fastener blank from the lower end of the former block 111 by the stripper 117 under the urge of the compressed spring 119. Since the downward movement of the bar 122 and prong bending plunger 135 occur while the transfer arms 91 are in their retracted position, as shown in Figs. 10 and 11, the next forward movement of the transfer bar 92 to present the fastener blank just severed to the prong bending station will result in the advancing forward edges of the transfer arms 91 engaging the extended tongues 10 of the 10 pronged fastener blank supported on the bar 122. Therefore, the movement of the transfer arms 91 from the full to the dotted line position as viewed in Fig. 12, will move the pronged blank along the bar 122 and deliver it to the upper end of a magazine 147, which is shown in its blank receiving position in Fig. 11.

Fastener blank magazine

As best shown in Figs. 2 and 3, the magazine 147 comprises a yoke 148 pivotally mounted on a shaft 149, the arms of the yoke 148 bridging the front of the prong bending mechanism just described. The yoke 148 provides a downwardly extending frame portion 150, and as best shown in Figs. 1 and 11, a curved portion 151 projecting above the yoke is adapted to register with the outer end of the clamping bar 122, to receive a pronged fastener blank when the latter is pushed off the bar 122 by the transfer arms 91, as described above. The yoke 148 further provides spaced ears 152, between which is pivotally mounted a guide 153 spaced from and having the same curvature as the portion 151, the guide 153 having a width slightly less than the distance between the bent prongs 11 of a fastener blank. Consequently, the guide 153 serves to direct each fastener downwardly into the magazine proper, as the fastener is pushed off of the bar 122.

As best shown in Figs. 1 and 17, the downwardly extending frame member 150 of the magazine 147 carries a second guide member 154 between spaced pairs of ears 155, the guide member 154 being in vertical alignment with the upper guide member 153 and being spaced from the frame member 150 so as to continuously direct each fastener downwardly through the magazine, with the prongs 10 embracing the guide member 154. The guide member 154 extends downwardly below the frame 150 and terminates in a substantially horizontal foot portion 154a providing a lip 156 at its end slightly higher than the thickness of a fastener. Consequently, a fastener sliding downwardly through the magazine will come to rest against the lip 156 on the guide 154, as shown in Fig. 22. From a comparison between Figs. 11 and 22, it is also apparent that the fastener will be reversed in its passage through the magazine; that is to say, while the fastener prongs 11 extend upwardly upon entering the upper end of the magazine, the prongs will extend downwardly when a fastener comes to rest against the lip 156 at the lower end of the magazine in position for being inserted into an envelope, as will be hereinafter described.

When a fastener comes to rest against the lip 156 at the end of the magazine, as shown in Fig. 22, the horizontal extending tongues 10 will be lightly engaged by a pair of spaced fingers 157 pivotally mounted on a pin 158 carried by the lower end of the magazine frame 150. As best shown in Figs. 18 and 19, the fingers 157 are joined by a yoke portion 159 and a spring 160 extends downwardly from the frame 150 to a point just above the yoke portion 159 to yieldingly limit upward turning movement of the fingers 157, as shown in Fig. 17.

The entire magazine assembly carried by the frame 154 and yoke 148 is turnable with the shaft 149, and as best shown in Figs. 1 and 2, one end of the shaft 149 has secured thereto a downwardly extending crank arm 161. The lower end of crank arm 161 is connected by a rod 162 to the upper end of a lever 163 pivotally mounted on the countershaft 33. The lever 163 carries a roll 164 yieldingly maintained in engagement with the surface of a cam 165 on the drive shaft 2 by the combined pulls of a spring 163a acting on an extension of lever 163 and a second spring 166 connected between a fixed point on the machine and the lower portion of the magazine frame portion 150. The cam 165 is so timed that with the parts in the position shown in Figs. 1, 11 and 21, the magazine 147 is held against the pull of the spring 166 with its upper end in register with the clamping bar 122, while its lower end is held away from the line of movement of a fastener attaching plunger 167. As the cam 165 falls away from the roll 164, the spring 166 will turn the magazine in a counterclockwise direction about the shaft 149 to position the fastener at the lower end of the magazine below the then raised plunger 167, the operation of which to first remove a fastener from the magazine, and then insert it in an envelope for clinching of the prongs will next be described.

*Fastener inserting mechanism*

As best shown in Fig. 1, the plunger 167 provides an enlarged portion 167a vertically movable in spaced guides 168 provided by the frame 1, the plunger being connected to a crank arm 169 by a pin 170 received in an elongated slot 171 in the arm 169. As best shown in Fig. 2, the crank arm 169 is formed integrally with a sleeve 172 pivotally mounted on a stud 173, with a second arm 174 extending rearwardly and overhanging the drive shaft 2. The free end of the arm 174 carries a roll 175 bearing on the surface of a cam 176 mounted on the shaft 2. The weight of the overhanging crank arm 174 is such as to cause the roll 175 to always bear on the cam 176, and the cam 176 is so designed as to impart a double reciprocatory movement to the plunger 167 for each complete revolution of the drive shaft 2. That is to say, starting from its raised position shown in Fig. 21, the plunger 167 moves downwardly to an intermediate position shown in Fig. 17, in which a sleeve 177 thereon is adapted to receive and hold a fastener presented by the foot portion 154a of the magazine. Following the withdrawal of the lower end of the magazine to the position shown in Fig. 21, the plunger 167 is again raised with its sleeve 177 carrying a fastener, after which the plunger 167 is again moved downwardly nearly the full length of its stroke to insert the prongs of the fastener in the envelope, as shown in Fig. 22. The plunger 167 is positively maintained in its prong inserting position by the cam 176 during the prong clinching operation, to be hereinafter described, whereupon its downward movement is completed to flatten or set the bent over prongs.

Referring again to Fig. 21, it will be seen that with the plunger 167 in its fully raised position, the sleeve 177 is yieldably maintained in extended position on the plunger by means of a spring 178 surrounding the plunger between the upper end of sleeve 177 and the shoulder at the enlarged portion 167a. The sleeve 177 is held on the plunger 167 by means of a set screw 179, the head of which is freely movable in a slot 180 provided in one side of the sleeve 177. The plunger 167 and its surrounding sleeve 177 are rectangular in cross section, and as clearly shown in Fig. 19, the dimensions of the rectangular opening 177a within the sleeve 177 are such as to closely fit the four pronged corners of a fastener, the outline of which is indicated in dotted lines. The lower portion of the sleeve 177, which extends below the end of the plunger 167 when the latter is in its raised position, provides pairs of alined notches 181 and 182 extending at right angles to each other, the notches 181 being adapted to freely receive the horizontal foot portion 154a of the magazine, while the notches 182 are adapted to freely receive the oppositely extending tongues 10 of a fastener, as clearly shown in Fig. 20.

When the plunger 167 carrying the extended sleeve 177 descends upon the lower end of the magazine carrying a fastener, the four bent prongs 11 at the corners of the fastener fit snugly within the rectangular opening 177a of the sleeve; consequently, when the plunger 167 starts its upward movement the fastener will be lifted by the sleeve, as indicated by the position of parts shown in Figs. 17 and 21. Since the upward movement of the plunger 167 starts while the horizontal foot portion 154a of the magazine is still stationary, the lifting of the fastener tongues 10 is permitted by the freely mounted fingers 157, which yield upwardly as shown in Fig. 17. When the fastener has been lifted far enough to clear the lip 156 at the end of the foot portion 154a, the magazine is swung in a clockwise direction by the cam 165 to clear the magazine from the sleeve 177, as shown in Fig. 21, at which time the plunger 167 with the sleeve 177 carrying a fastener is at the upper end of its stroke. In this position of the magazine foot portion 154a, the fingers 157 have returned to their normal position to receive the next fastener as it slides beneath them and properly aline the same as the fastener comes to rest against the lip 156, see Fig. 22.

With the plunger 167 in its fully raised position shown in Fig. 21, the lower end of the sleeve 177 carrying a fastener is spaced well above a stationary horn or anvil 183 so formed as to readily separate the front and rear walls 184 of an envelope placed on the anvil 183 while the plunger 167 is in its raised position. Therefore, when the plunger 167 moves downwardly to the position shown in Fig. 22, the pointed fastener prongs are forced through the upper wall 184 of the envelope by the sleeve 177 telescoping on the plunger 167 following engagement of its lower edge with the envelope wall. That portion of the envelope wall 184 between the fastener prongs 11 is held firmly as the fastener prongs are pressed through the paper by an anvil block 185 yieldably mounted in a recess 186 provided in the anvil. As best shown in Figs. 24 and 25, the anvil block 185 is bridged by the spaced prongs 11 of a fastener as the latter are inserted in the wall of the envelope, the block 185 being yieldably maintained with its upper surface supporting the under side of the envelope wall by means of springs 187 seated in alined recesses 188 provided in the block 185 and anvil 183, respectively. Studs 189 passing through the springs 187 and riveted in the block 185 serve to aline the block 185, heads 190 on the studs serving to determine the position of the upper surface of the block 185, when there is no envelope on the anvil. Following the penetration of the envelope wall by the prongs 11 on opposite sides of the anvil block 185, and while the plunger 167 remains in the position shown in Fig. 22, slightly above the surface of the fastener, the downwardly extending prongs are bent under, as shown in Fig. 24, and then set as shown in Fig. 26, by a prong clinching and setting mechanism.

Prong clinching and setting mechanism

As best shown in Figs. 28 and 29, the anvil recess 186 in which is mounted the anvil block 185 also receives a pair of oppositely disposed prong clinching levers 191. Each lever 191 is pivotally mounted on a pin 192 and a rearward extension 193 of the lever is pivotally connected to a link 194. The opposite ends of the two links 194 are pivotally connected to the upper ends of the spaced arms 195 of a yoke forming part of a lever 196 freely turnable on the countershaft 33, as best shown in Figs. 1 and 2. A roll 197 is rotatably mounted on a pin 198 extending between the arms 195, the roll 197 bearing on a cam 199 mounted on the drive shaft 2. A spring 200 pulling on an extension 196a of the lever 196 serves to yieldingly maintain the roll 197 in engagement with the cam 199, the cam being so designed that the links 194 hold the clinching levers 191 spaced apart prior to and during the insertion of the prongs of the fasteners through the envelope wall, as previously described.

Following the insertion of the fastener prongs through the envelope wall, as indicated in Fig. 22, turning of the lever 196 in a counterclockwise direction by the cam 199 imparts simultaneous movement to the links 194 in the direction of the arrows in Fig. 30, thereby turning the clinching levers 191 toward each other. Movement of the levers 191 with reference to the anvil block 185 is permitted by the provision of opposed slots 201 in the levers 191, which slots 201 receive the block 185. The result of moving the levers 191 together is clearly illustrated, on an enlarged scale, in Figs. 24 and 25, from which it is apparent that the prongs of the fastener have been bent under, or clinched, around the wall of the envelope. The prong bending occurs freely, owing to the clearance between the lower end of the plunger 167 and the fastener. Following the bending or clinching of the prongs as shown in Fig. 24, the clinching levers 191 remain stationary, due to a dwell on the cam 199, whereupon the cam 176 imparts a slight further downward movement to the plunger 167. This final movement of the plunger 167 tightly squeezes the bent-under prongs 11 between the plunger 167 and the clinching levers 191, thereby firmly setting the clinched prongs, as clearly illustrated in Fig. 26. It will be noted that the inside edges of the levers 191 are rounded to prevent the points of the fastener prongs from cutting into the paper of the envelope wall, as a result of the final setting operation.

Following the prong clinching and setting operation, the envelope is withdrawn with the fastener attached thereto, as the plunger 167 starts to move upwardly. When the plunger 167 is raised to the dotted line position of Fig. 22, the foot portion 154a of the magazine is then permitted to position another fastener beneath the plunger preparatory to the start of another cycle of operations. The raising of the plunger 167 also permits another envelope to be positioned on the anvil 183, with the walls thereof separated. In order to expedite the positioning of an envelope on the anvil 183, the latter is pivotally mounted on trunnions 202 received in bearing blocks 203, as shown in Fig. 29. A downward extension 204 of the anvil is connected to one end of a spring 205, the pull of which tends to throw the pointed end of the anvil upwardly to an extent determined by an adjustable stop bolt 206 bearing on a fixed portion of the frame. Thus the pointed end of the anvil is maintained in a position slightly spaced above the top of a plate 207 to permit the ready passage of the lower wall of the envelope beneath the anvil 183. Obviously, the pressure applied during the prong setting operation is transmitted through the anvil 183 and the bottom wall of the envelope to the plate 207.

Operation and adjustment of the machine

In the operation of the machine, each revolution of the drive shaft 2 imparts a complete cycle of movements to the various mechanisms under the control of the several cams mounted on the shaft 2. Assuming that the parts of the fastener strip feeding and cutting mechanism and the parts of the fastener blank bending mechanism occupy the position shown in Fig. 11 at the beginning of the operating cycle, it is evident that a flat blank is then supported in the notches 90 of the transfer bar 92, while a bent blank is supported prongs up on the clamping bar 122. Furthermore, the upper portion of the magazine 147 is then in alinement with the clamping bar 122, so that its lower foot portion 154a occupies a position in which it is retracted from beneath the then raised plunger 167, as shown in Fig. 21. In other words, the drive shaft 2 has come to rest at the conclusion of the previous operating cycle, with the parts in the position described above.

Preferably, the drive shaft 2 is connected to its source of power through a one-revolution clutch under the control of the machine operator, so that a complete revolution of the drive shaft will result from the depression of a suitable foot treadle, not shown, by the operator after an envelope is placed on the anvil 183, as shown in Fig. 22. Starting with the parts in the position of Fig. 11, it is evident that at the very start of the cycle, forward movement of the feed bar 4 will result in feeding a predetermined length of fastener strip beneath the then raised cutter 71, as shown in Fig. 8, the movement of the feed bar 4 being accompanied by forward movement of the transfer bar 92 to position a flat blank, supported in the notches 90, over the clamping bar 122 and the then lowered forming plunger 135. Since as previously pointed out, a pronged fastener is supported on the clamping bar 122 at the initiation of the operating cycle, forward movement of the transfer bar 92 will also serve to push the pronged fastener into the open end of the magazine 147, so that a completed fastener will be delivered to the lower end of the magazine 147 at the very start of the cycle.

As soon as a flat blank supported in the notches 90 is positioned over the clamping bar 122, the clamping bar 122 is raised to the position of Fig. 9 to clamp the flat blank securely against the former block 111, the spring 115 yielding until the upper end of the block 111 abuts the stationary supporting block 78. This clamping action results in lifting the tongues 10 of the blank clear of the notches 90, so that the transfer bar 92 is free to be retracted to position the notches 90 under the tongues 10 of the blank portion that has previously been fed with the strip 3. Continued rotation of the drive shaft thereupon imparts upward movement to the forming plunger 135 to bend the prongs 11 about the edges of the then stationary former block 111, as shown in Fig. 10. Upward movement of the plunger 135 is accompanied by a downward movement of the cutter 71 to sever a blank from the strip, the tongues 10 of the severed blank immediately entering the notches 90 of the retracted transfer bar 92, so that the blank is supported in a horizontal plane, as also shown in Fig. 10. Following the bending of the prongs and the severance of a blank, the forming plunger 135 is lowered and the cutter 71 is raised to the position shown in Fig. 11. As the plunger 135 clears the former block 111, the compressed springs 119 surrounding the strippers 117 cause the latter to clear the prongs of the fastener from the block 111, as shown in Fig. 11. Consequently, the end of an operating cycle of the strip feeding, cutting and bending mechanism finds a pronged fastener freely supported on the then lowered clamping bar 122 and a flat fastener blank supported by its tongues 10 in the notches 90 of the retracted transfer bar 92.

As previously pointed out, the forward movement of the transfer bar 92 at the beginning of an operating cycle delivers a finished fastener to the magazine 147, and following the arrival of the fastener in engagement with the foot portion 154a of the magazine, the magazine 147, as a whole, is turned about its pivotal axis to bring the foot portion 154a beneath the then raised plunger 167. The cam 176 controlling the operation of the plunger is so timed that following the positioning of a fastener below the plunger 167, the plunger is moved to its intermediate position shown in Fig. 17 to cause its sleeve 177 to frictionally engage a fastener carried by the foot portion 154a. Consequently, the immediate return of the plunger 167 to its upper position results in the sleeve 177 lifting the fastener from the foot portion 154a, whereupon the magazine is swung clear of the plunger 167, as shown in Fig. 21. The plunger 167 with its sleeve 177 frictionally carrying the pronged fastener thereupon makes its full downward stroke to insert the prongs of the fastener into the rear wall of an envelope, as shown in Fig. 22. The prong inserting operation is followed by prong clinching in the manner previously described, whereupon the plunger 167 returns to its raised position shown in Fig. 21, and comes to rest at the completion of the operating cycle.

From the foregoing, it is apparent that each complete operating cycle of the machine results in feeding of the fastener strip a predetermined amount and the transfer of a previously severed flat blank to the prong bending means, coincidentally with the delivery of a pronged blank by the magazine to the fastener inserting plunger. The subsequent operations of severing a new blank from the fed strip and the bending of the prongs of the blank just transferred are accompanied by the insertion of a pronged fastener into the envelope and its clinching, so that all the operations of the machine involving shock and pressure are timed to occur in substantially the same part of the operating cycle, with a resulting reduction in vibration of the moving parts.

I claim,

1. In a machine of the class described, the combination with means for intermittently feeding a continuous metallic strip comprising tongue and prong fasteners connected prong to prong, means for severing flat fastener blanks one by one from said strip, means for bending prongs on each severed blank, and a movable delivery chute for the fasteners, of means operating in unison for transferring a severed flat blank from the severing means for operation upon by said prong bending means and for transferring a fastener with bent prongs from the prong bending means to said chute.

2. In a machine of the class described, the combination with means for intermittently feeding a continuous strip comprising tongue and prong fasteners connected prong to prong, means for severing flat fastener blanks one by one from said strip, means for bending attaching prongs on each severed blank, and a movable delivery chute for the fasteners, of a reciprocatory transfer member adapted by its movement in one direction to simultaneously carry a flat blank from the severing means to the prong bending means and a pronged fastener from the prong bending means to said chute.

3. In a machine of the class described, the combination with means for intermittently feeding a continuous strip of fasteners, a reciprocatory punch for severing flat fastener blanks from said strip and a reciprocatory plunger spaced from said punch, of a reciprocatory transfer member adapted to receive a blank severed from said strip by said punch and convey it into register with said plunger and a clamping member adapted to remove said blank from said transfer member and carry it into engagement with a former opposed to said plunger.

4. In a machine of the class described, the combination with means for intermittently feeding a continuous strip of fasteners, a reciprocatory punch for severing flat fastener blanks from said strip and a reciprocatory plunger spaced from said punch, of a reciprocatory transfer member adapted to receive a blank severed from said strip by said punch and convey it into register with said plunger and a clamping member adapted to remove said blank from said transfer member and carry it into engagement with a former opposed to said plunger, the removal of said blank from said transfer member being followed by the return of said transfer member to its blank receiving position with respect to said punch.

5. In a machine of the class described, the combination with means for intermittently feeding a continuous strip of tongue and prong fasteners connected prong to prong, means for severing the strip between joined prong portions to provide fastener blanks, means for bending prongs on each severed blank, and means for attaching each pronged fastener to an envelope, of means for transferring a severed flat blank from the severing means for operation upon by said prong bending means, and means, including in part said transferring means, for transferring a blank with bent prongs from the prong bending means to said fastener attaching means.

6. In a machine of the class described, the combination with means for intermittently feeding a continuous strip of tongue and prong fasteners connected prong to prong, means for severing the strip between joined prong portions to provide fastener blanks, means for bending prongs on each severed blank, means for attaching each pronged fastener to an envelope, means for transferring a severed flat blank from the severing means for operation upon by said prong bending means, and means, including in part said transferring means, for transferring a blank with bent prongs from the prong bending means to said fastener attaching means, of means for operating said feeding means and said blank transfer means in unison to feed a predetermined length of strip, to transfer a previously severed blank to the bending means and to transfer a previously bent blank to said attaching means.

7. In a machine of the class described, the combination with means for intermittently feeding a continuous strip of tongue and prong fasteners connected prong to prong, a cutter for severing the strip between joined prong portions to provide fastener blanks, a plunger and co-operating former for bending attaching prongs on each blank and a plunger for attaching a fastener with bent prongs to an envelope, of a movable delivery chute extending between said bending plunger and said attaching plunger, and means for simultaneously transferring a flat blank from said cutter to said bending plunger and a blank with bent prongs from said bending plunger to said chute.

8. In a machine of the class described, the combination with means for intermittently feeding a continuous strip of tongue and prong fasteners connected prong to prong, a cutter for severing the strip between joined prong portions to provide fastener blanks, a plunger and co-operating former for bending attaching prongs on each blank and a plunger for attaching a fastener with bent prongs to an envelope, of a movable delivery chute extending between said bending plunger and said attaching plunger, and means for simultaneously transferring a flat blank from said cutter to said bending plunger and a blank with bent prongs from said bending plunger to said chute, subsequent movement of said chute serving to position a fastener with bent prongs for operation upon by said attaching plunger.

9. In a machine of the class described, the combination with a pivotally mounted chute adapted to support a pronged fastener with its prongs downward, a reciprocatory plunger and a stationary anvil for supporting the wall of an envelope, of means for turning said chute to position a fastener carried at the end thereof below said plunger, and means for imparting a compound reciprocatory movement to said plunger to first frictionally engage and lift a fastener from said chute and then carry said fastener towards said anvil for an insertion in the envelope wall thereon.

10. In a machine of the class described, the combination with a pivotally mounted chute adapted to support a pronged fastener with its prongs downward, a reciprocatory plunger and a stationary anvil for supporting the wall of an envelope, of means for moving said chute to position a fastener supported at the lower end thereof beneath said plunger in its raised position, means for moving said plunger part way towards and away from said anvil to frictionally engage and lift a fastener from said chute, means for withdrawing said chute from beneath said plunger, and means for moving said plunger all the way towards said anvil to insert the fastener carried thereby through the wall of the envelope on the anvil.

11. In a machine of the class described, the combination with means for intermittently feeding a continuous strip comprising tongue and prong fasteners connecting prong to prong, means for severing the strip between the joined prong portions to provide flat fastener blanks, means for bending prongs on each severed blank, and a chute for transferring fasteners to a fastener attaching station, of means operating in timed relation with said blank severing means for transferring each flat blank from the severing means to said bending means and for delivering each pronged blank from the prong bending means to the chute.

12. In a machine of the class decribed, the combination with means for intermittently feeding a continuous strip of tongue and prong fasteners connected prong to prong, means for severing the strip between joined prong portions to provide fastener blanks, means for bending prongs on each severed blank, and means for operating said severing means and said prong-bending means in unison, of a reciprocatory transfer member adapted to receive a blank severed from said strip by the severing means and convey it to said prong-bending means, and means for actuating said reciprocatory transfer member to transfer the blank and to return said member to blank-receiving position between successive operations of the blank-severing means.

ABRAHAM NOVICK.